(12) United States Patent
Hwang et al.

(10) Patent No.: US 9,996,214 B2
(45) Date of Patent: Jun. 12, 2018

(54) DEVICE AND METHOD OF UNLOCKING DEVICE

(71) Applicant: SAMSUNG ELECTRONICS CO., LTD., Suwon-si (KR)

(72) Inventors: Seong-taek Hwang, Pyeongtaek-si (KR); Chang-yeong Kim, Seoul (KR); Jeong-hoon Park, Seoul (KR); Dong-wook Kwon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 26 days.

(21) Appl. No.: 15/110,275

(22) PCT Filed: Jan. 7, 2015

(86) PCT No.: PCT/KR2015/000134
§ 371 (c)(1),
(2) Date: Jul. 7, 2016

(87) PCT Pub. No.: WO2015/105326
PCT Pub. Date: Jul. 16, 2015

(65) Prior Publication Data
US 2016/0328094 A1 Nov. 10, 2016

(30) Foreign Application Priority Data
Jan. 7, 2014 (KR) .......................... 10-2014-0002079

(51) Int. Cl.
| | |
|---|---|
| *G06F 3/041* | (2006.01) |
| *G06F 3/0481* | (2013.01) |
| *G06F 3/0488* | (2013.01) |
| *G06F 3/0354* | (2013.01) |
| *G06F 21/36* | (2013.01) |
| *G06F 3/0484* | (2013.01) |

(52) U.S. Cl.
CPC .......... *G06F 3/0481* (2013.01); *G06F 3/0354* (2013.01); *G06F 3/03545* (2013.01);
(Continued)

(58) Field of Classification Search
CPC .... G06F 3/0481; G06F 3/0484; G06F 3/0354; G06F 21/36; G06F 3/04883;
(Continued)

(56) References Cited

U.S. PATENT DOCUMENTS

| | | |
|---|---|---|
| 2005/0237310 A1 | 10/2005 | Fabritius et al. |
| 2007/0150842 A1 | 6/2007 | Chaudhri et al. |

(Continued)

FOREIGN PATENT DOCUMENTS

| | | |
|---|---|---|
| KR | 10-2007-0016330 A | 2/2007 |
| KR | 10-2011-0100986 A | 9/2011 |

(Continued)

OTHER PUBLICATIONS

EMR Pen Technology Electro Magnetic Resonance Technology; "http://www.wacom.co.jp"; Apr. 2010; 4 pgs. total.
(Continued)

*Primary Examiner* — Jonathan Boyd
(74) *Attorney, Agent, or Firm* — Sughrue Mion, PLLC

(57) ABSTRACT

A device and a method of unlocking a device are provided. The method of unlocking a device includes: determining whether an input tool of the device is separated from the device, when a disabled screen of the device is enabled; selecting one user interface from among a plurality of user interfaces for unlocking the device on the enabled screen of the device, based on the determination result; displaying the selected user interface on the screen of the device; and receiving a touch input with respect to the displayed user interface. The plurality of user interface include a user interface for receiving a touch input by the input tool and a user interface for receiving a touch input by a body part of a user.

19 Claims, 10 Drawing Sheets

(52) U.S. Cl.
CPC .......... *G06F 3/0416* (2013.01); *G06F 3/0484* (2013.01); *G06F 3/04883* (2013.01); *G06F 21/36* (2013.01); *G06F 2200/1632* (2013.01); *G06F 2203/04101* (2013.01); *G06F 2203/04106* (2013.01); *G06F 2203/04108* (2013.01)

(58) Field of Classification Search
CPC ................ G06F 3/03545; G06F 3/0416; G06F 2203/04108; G06F 2200/1632; G06F 2203/04101; G06F 2203/04106
See application file for complete search history.

(56) References Cited

U.S. PATENT DOCUMENTS

| | | | |
|---|---|---|---|
| 2010/0081479 A1* | 4/2010 | Lee ...................... | G06F 1/1626 455/566 |
| 2010/0194693 A1 | 8/2010 | Selin et al. | |
| 2012/0127096 A1 | 5/2012 | Chan | |
| 2012/0306927 A1* | 12/2012 | Lee ...................... | G06F 3/041 345/660 |
| 2013/0055169 A1 | 2/2013 | Wright et al. | |
| 2013/0263254 A1 | 10/2013 | Seo et al. | |

FOREIGN PATENT DOCUMENTS

| | | |
|---|---|---|
| KR | 10-2012-0133004 A | 12/2012 |
| WO | 02/063447 A1 | 8/2002 |

OTHER PUBLICATIONS

Communication dated Feb. 17, 2015 issued by the International Searching Authority in counterpart International Application No. PCT/KR2015/000134 (PCT/ISA/220/210/237).

Communication dated Aug. 1, 2017 by the European Patent Office in counterpart European Patent Application No. 15735086.9.

* cited by examiner

[Fig. 1]
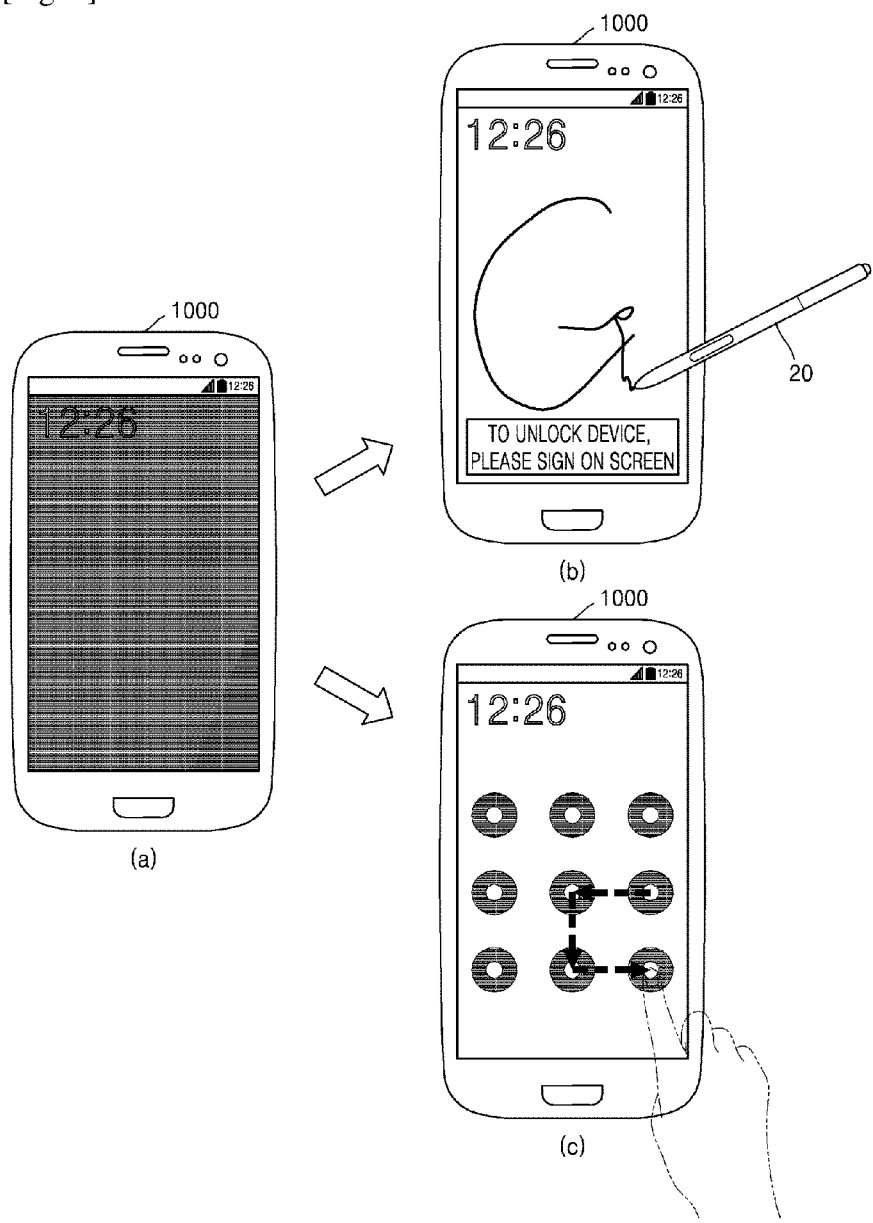

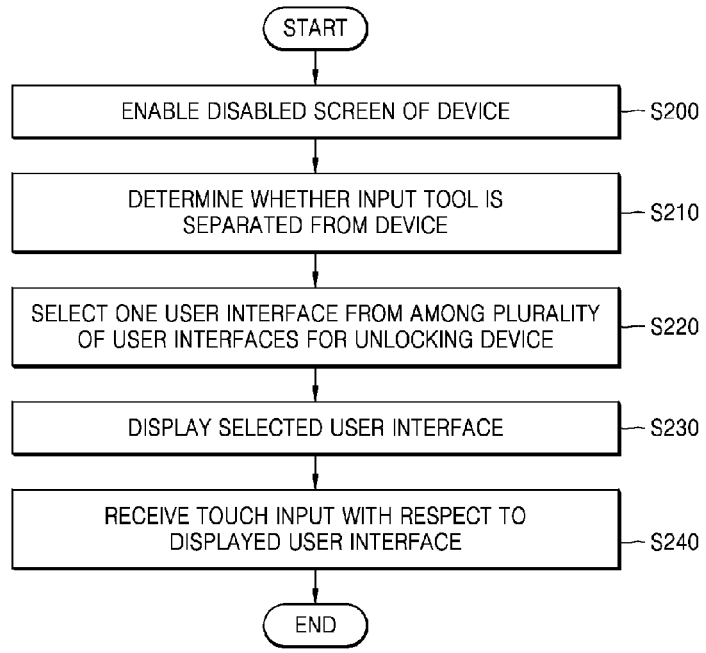
[Fig. 2]
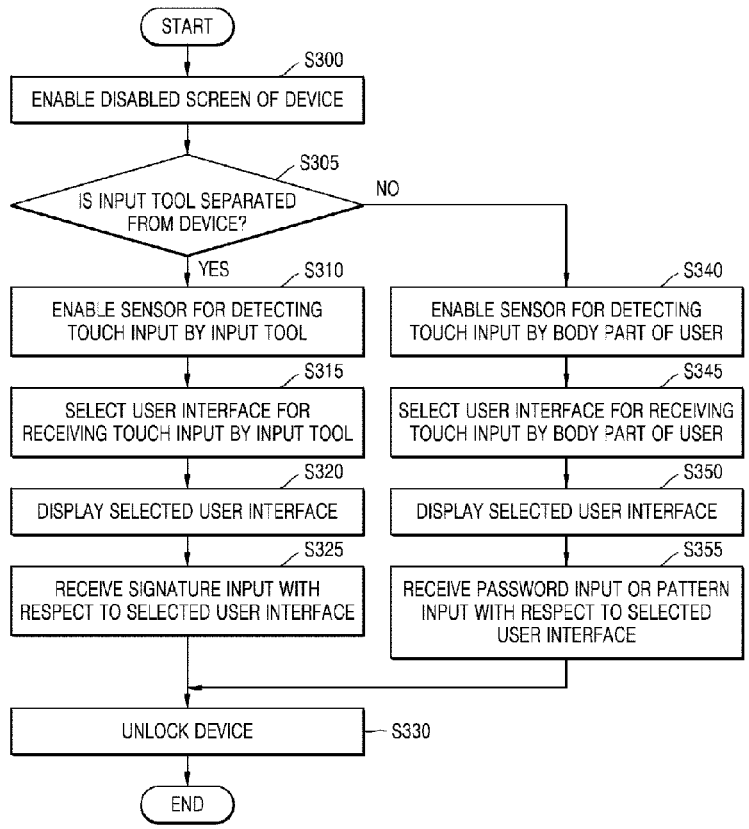
[Fig. 3]

[Fig. 4]
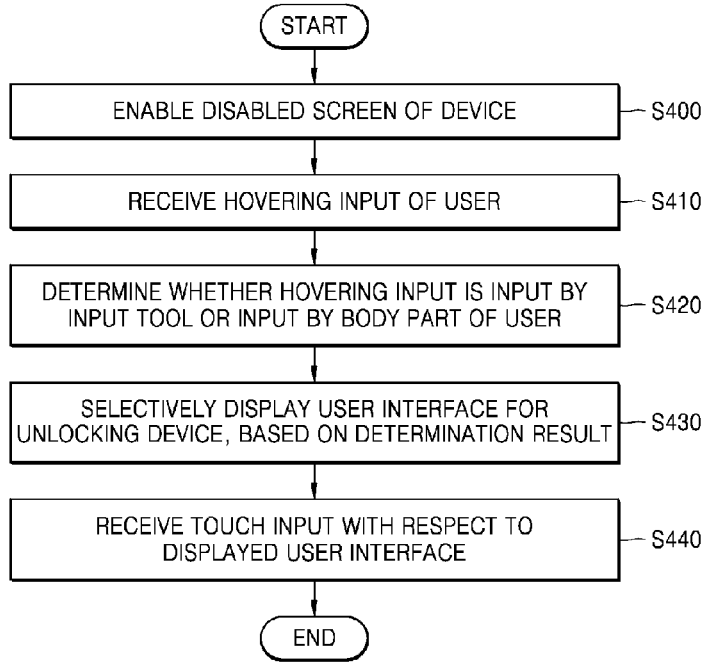
[Fig. 5]
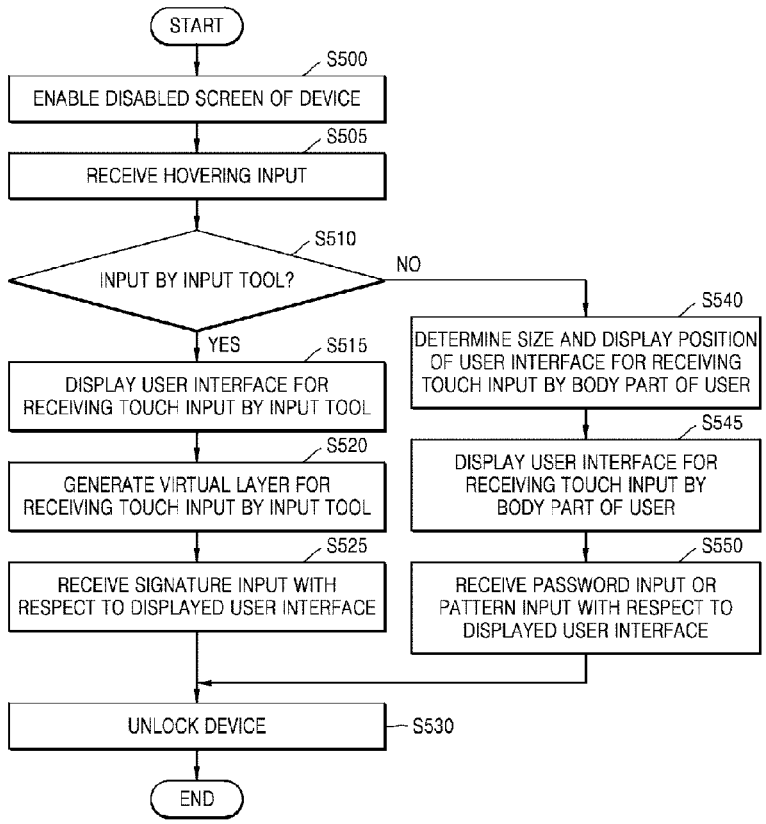

[Fig. 6]
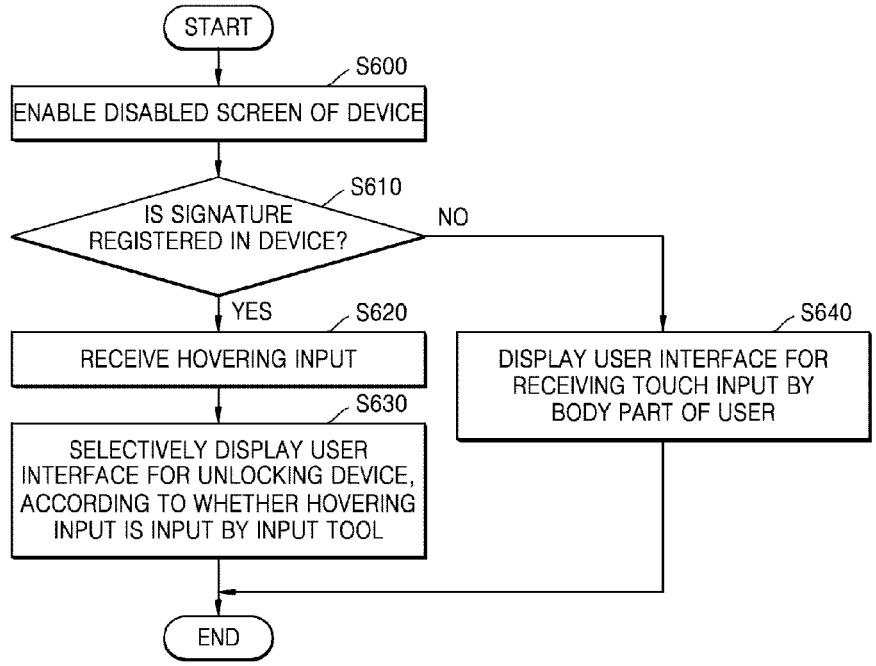
[Fig. 7]
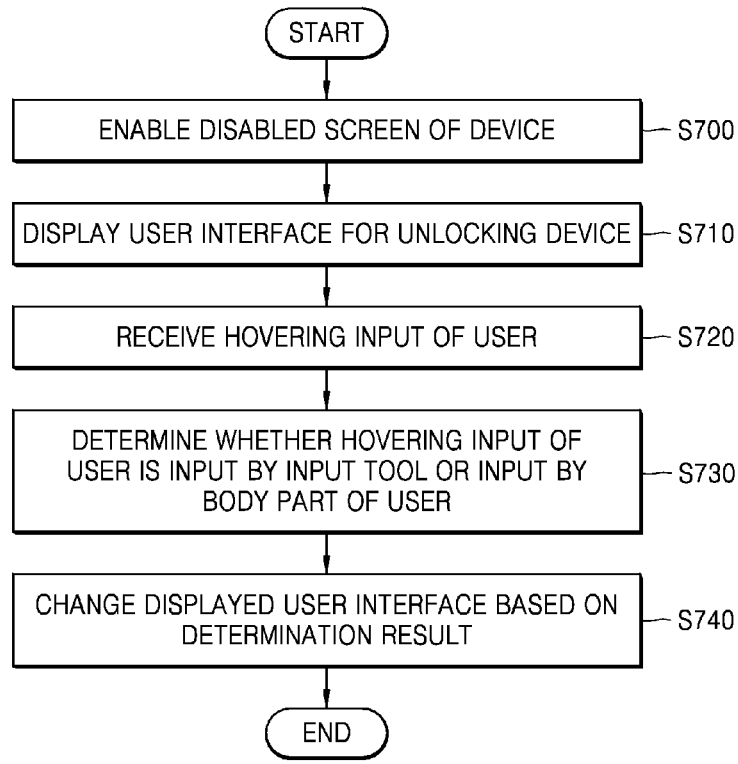

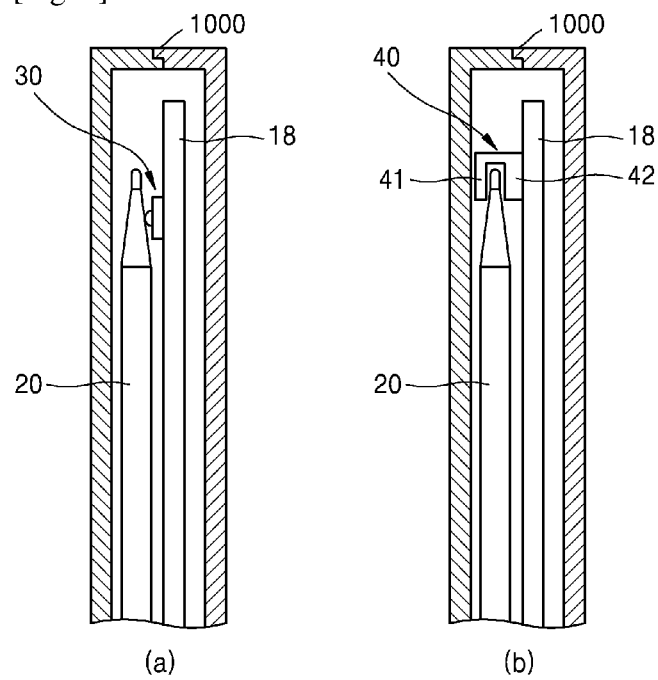

[Fig. 9]
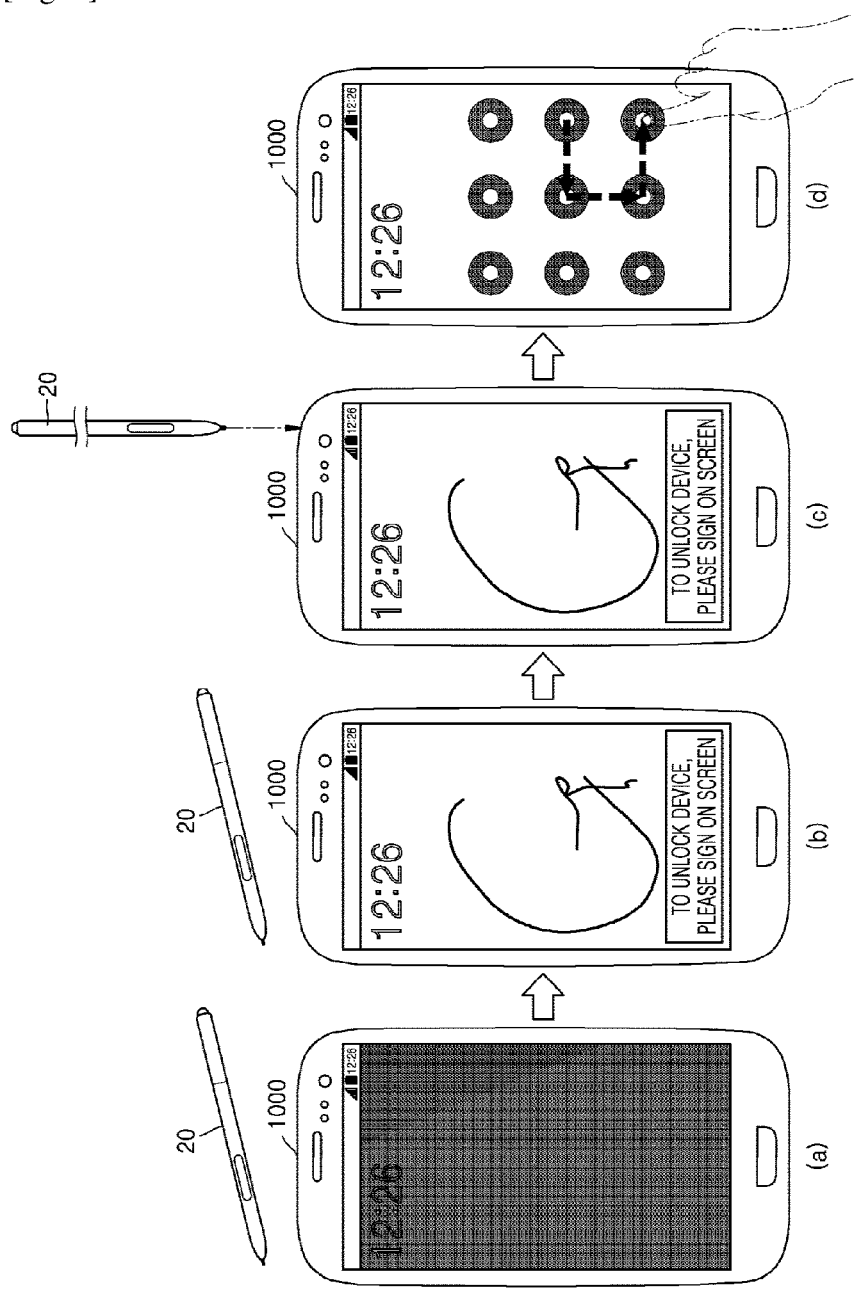

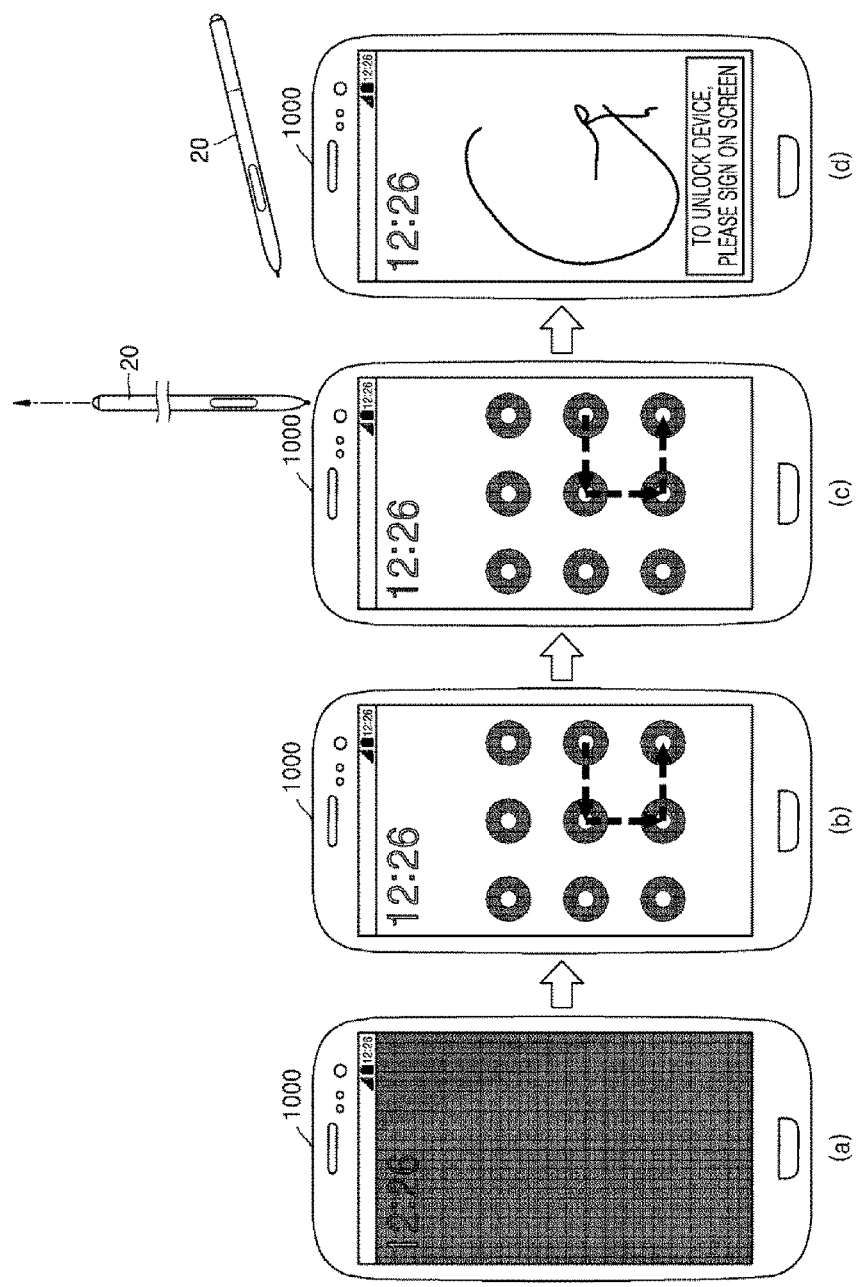
[Fig. 10]

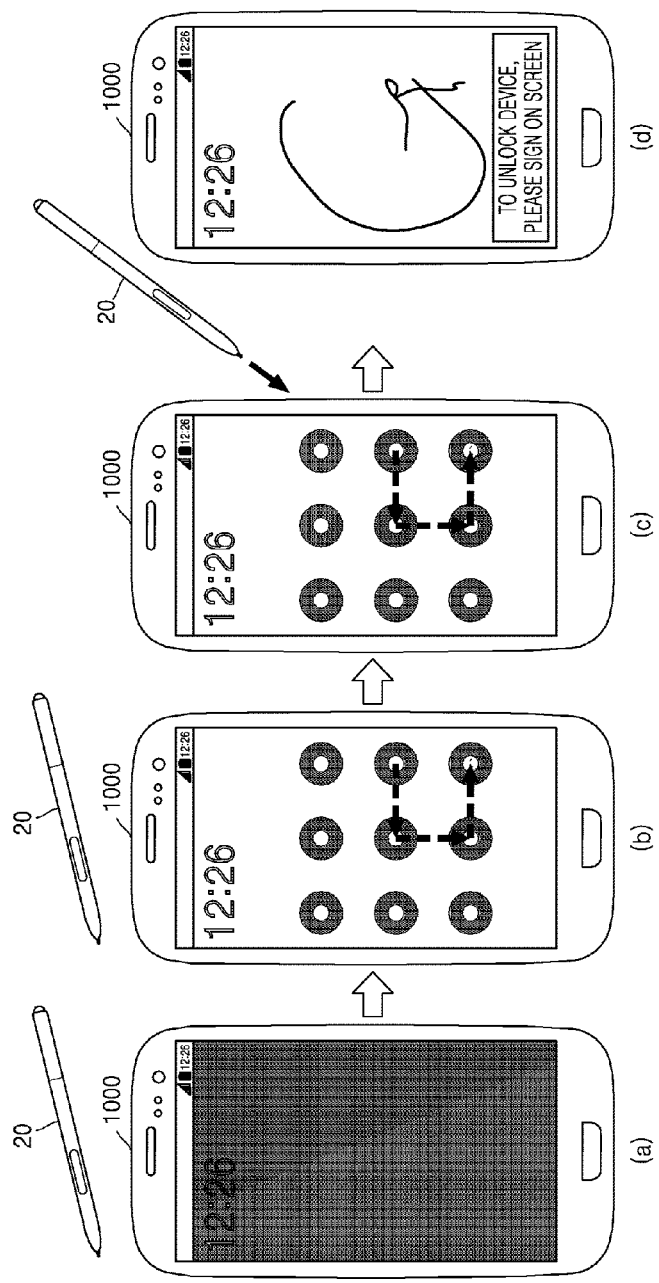
[Fig. 11]

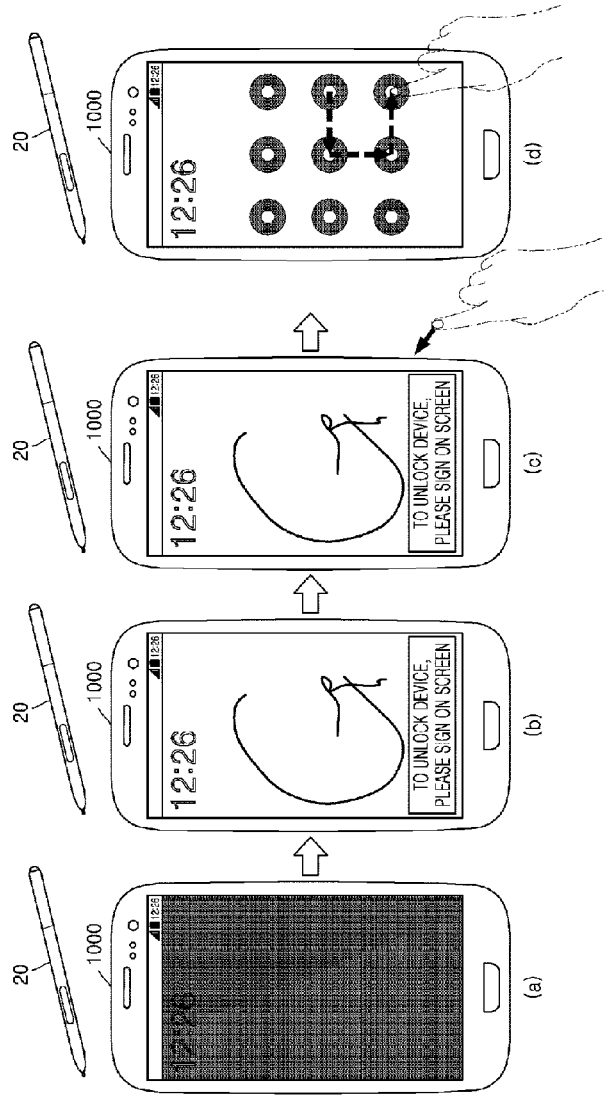
[Fig. 12]
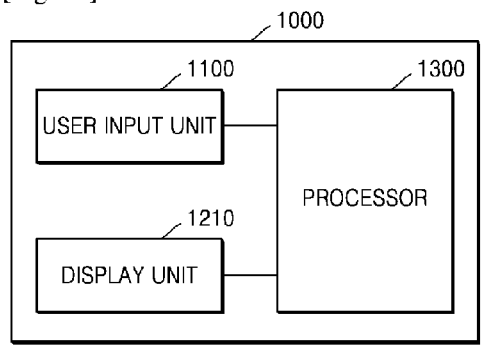
[Fig. 13]

[Fig. 14]
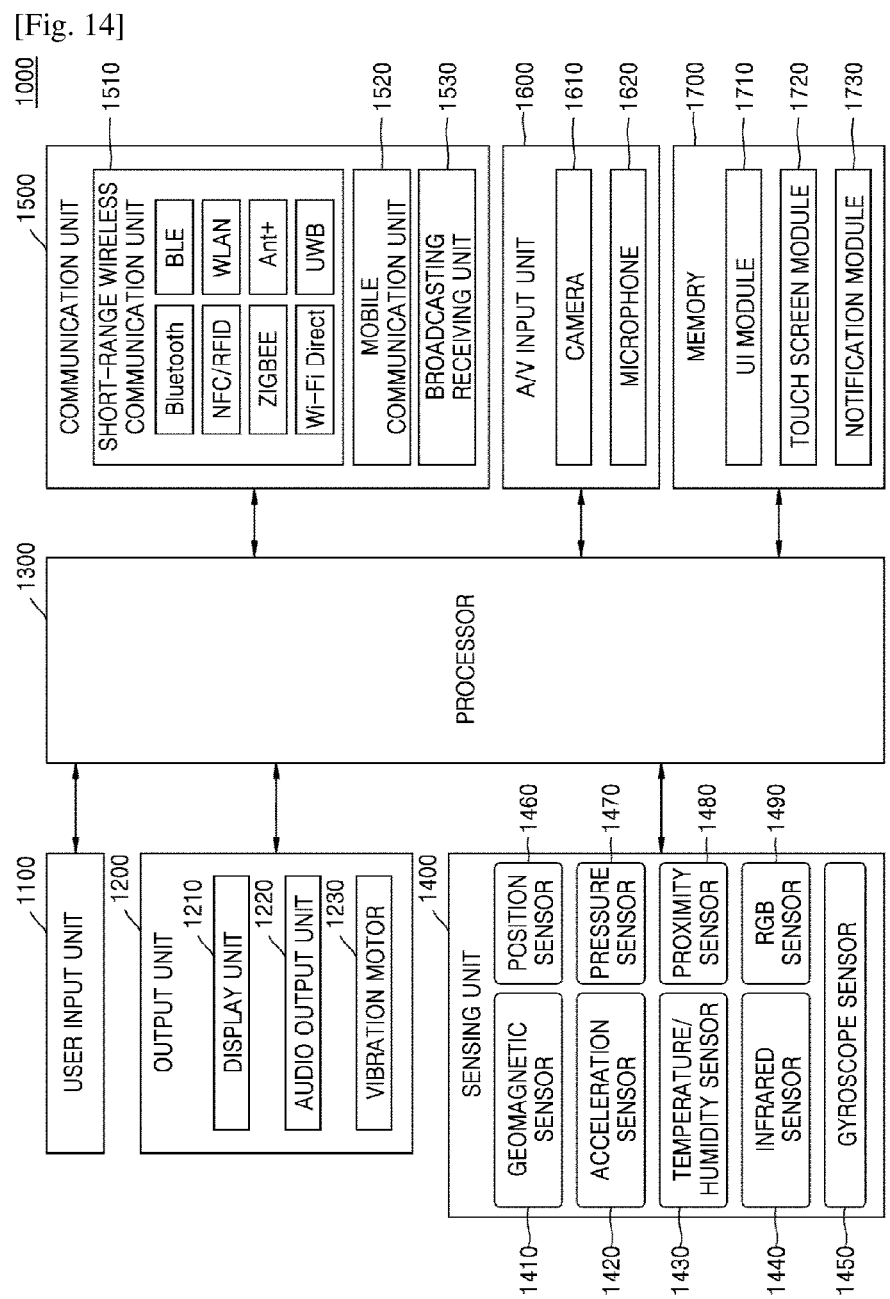

DEVICE AND METHOD OF UNLOCKING DEVICE

TECHNICAL FIELD

One or more exemplary embodiments relate to a device and a method of unlocking a device based on attachment/detachment of an input tool or a hovering input.

BACKGROUND ART

With the development of multimedia technologies and network technologies, various types of devices have been available. In addition, in order to protect a user's privacy for data stored in a device and prevent indiscriminate use by the third party, unlocking technologies for unlocking the device have been developed. Furthermore, a device that supports a separate input tool may distinguish a touch input by the input tool and a touch input by a body part of a user. Accordingly, various types of unlocking methods have been provided.

Thus, there is a need for a technology that allows a user to more easily unlock a device by effectively providing an unlocking screen optimized for each touch input unit.

DISCLOSURE OF INVENTION

SOLUTION TO PROBLEM

One or more exemplary embodiments include a device and a method of unlocking a device, capable of selectively displaying a user interface for unlocking the device, based on a separation of an input tool from the device.

One or more exemplary embodiments include a device and a method of unlocking a device, capable of selectively displaying a user interface for unlocking the device, based on a hovering input with respect to the device.

Additional aspects will be set forth in part in the description which follows and, in part, will be apparent from the description, or may be learned by practice of the presented exemplary embodiments.

BRIEF DESCRIPTION OF DRAWINGS

These and/or other aspects will become apparent and more readily appreciated from the following description of the exemplary embodiments, taken in conjunction with the accompanying drawings in which:

FIG. 1 is a diagram of a device that selectively displays a user interface for unlocking the device, according to an exemplary embodiment;

FIG. 2 is a flowchart of a method of selectively displaying a user interface for unlocking a device, based on a separation of an input tool, according to an exemplary embodiment;

FIG. 3 is a detailed flowchart of a method of selectively displaying a user interface for unlocking a device, based on a separation of an input tool, according to an exemplary embodiment;

FIG. 4 is a flowchart of a method of selectively displaying a user interface for unlocking a device, based on a hovering input, according to an exemplary embodiment;

FIG. 5 is a detailed flowchart of a method of selectively displaying a user interface for unlocking a device, based on a hovering input, according to an exemplary embodiment;

FIG. 6 is a flowchart of a method of selectively displaying a user interface for unlocking a device, based on a registration of a signature in the device, according to an exemplary embodiment;

FIG. 7 is a flowchart of a method of changing a user interface for unlocking a device, based on a hovering input, according to an exemplary embodiment;

FIG. 8 is a diagram illustrating a configuration of a device for determining whether an input tool is separated from the device, according to an exemplary embodiment;

FIGS. 9A to 10D are diagrams of a device that selectively displays a user interface for unlocking the device, based on attachment/detachment of an input tool, according to an exemplary embodiment;

FIGS. 11A to 12D are diagrams of a device that selectively displays a user interface for unlocking the device, based on a hovering input, according to an exemplary embodiment; and FIGS. 13 and 14 are block diagrams of a device according to an exemplary embodiment.

BEST MODE FOR CARRYING OUT THE INVENTION

According to one or more exemplary embodiments, a method of unlocking a device includes: determining whether an input tool of the device is separated from the device, when a disabled screen of the device is enabled; selecting one user interface from among a plurality of user interfaces for unlocking the device of the device, based on the determination result; displaying the selected user interface on the screen of the device; and receiving a touch input with respect to the displayed user interface, wherein the plurality of user interface include a user interface for receiving a touch input by the input tool and a user interface for receiving a touch input by a body part of a user.

The method may further include, when it is determined that the input tool is separated from the device, enabling a sensor for detecting the touch input by the input tool, wherein the selecting of the user interface includes selecting the user interface for receiving the touch input by the input tool, based on the determination that the input tool is separated from the device.

The user interface for receiving the touch input by the input tool may be a user interface for receiving a signature input of the user.

The method may further include, when it is determined that the input tool is not separated from the device, enabling a sensor for detecting the touch input by the body part of the user, wherein the selecting of the user interface include selecting comprises selecting the user interface for receiving the touch input by the body part of the user, based on the determination that the input tool is not separated from the device.

The user interface for receiving the touch input by the body part of the user may be a user interface for receiving a password input of the user or a pattern input of the user.

A sensor for detecting the touch input by the input tool and a sensor for detecting the touch input by the body part of the user may be selectively enabled based on the determination result.

According to one or more exemplary embodiments, a method of unlocking a device includes: receiving a hovering input of a user when a disabled screen of the device is enabled; determining whether the hovering input is an input by an input tool or an input by a body part of the user; and selectively displaying a plurality of user interfaces for unlocking the device, based on the determination result.

The displaying of the plurality of user interfaces may include displaying a user interface for receiving a touch input by the input tool when it is determined that the hovering input is the input by the input tool.

The user interface for receiving the touch input by the input tool may be a user interface for receiving a signature input of the user.

The displaying of the plurality of user interfaces may include displaying a user interface for receiving a touch input by the body part of the user, based on the determination that the hovering input is the input by the body part of the user.

The user interface for receiving the touch input by the body part of the user may be a user interface for receiving a password input of the user or a pattern input of the user.

The method may further include displaying a first user interface for unlocking the device, wherein the first user interface is changed to a second user interface for unlocking the device, based on the determination result.

The first user interface may be determined according to whether a signature of the user is registered in the device.

According to one or more exemplary embodiments, a device includes: a processor that determines whether an input tool of the device is separated from the device, when a disabled screen of the device is enabled, and selects one user interface from among a plurality of user interfaces for unlocking the device of the device, based on the determination result; and a display unit that displays the selected user interface on the screen of the device, wherein the processor unlocks the device, based on a touch input with respect to the displayed user interface, and the plurality of user interfaces include a user interface for receiving a touch input by the input tool and a user interface for receiving a touch input by a body part of the user.

When it is determined that the input tool is separated from the device, the processor may enable a sensor for detecting the touch input by the input tool, and when it is determined that the input tool is separated from the device, the processor may select a sensor for detecting the touch input by the input tool.

The user interface for receiving the touch input by the input tool may be a user interface for receiving a signature input of the user.

When it is determined that the input tool is separated from the device, the processor may enable a sensor for detecting the touch input by the body part of the user, and when it is determined that the input tool is separated from the device, the processor may select a user interface for detecting the touch input by the body part of the user.

The user interface for receiving the touch input by the body part of the user may be a user interface for receiving a password input of the user or a pattern input of the user.

A sensor for detecting the touch input by the input tool and a sensor for detecting the touch input by the body part of the user may be selectively enabled based on the determination result.

According to one or more exemplary embodiments, a device includes: a user input unit that receives a hovering input of a user when a disabled screen of the device is enabled; a processor that determines whether the hovering input is an input by an input tool or an input by a body part of the user; and a display unit that selectively displays a plurality of user interfaces for unlocking the device, based on the determination result.

The display unit may display a user interface for receiving a touch input by the input tool when it is determined that the hovering input is the input by the input tool.

The user interface for receiving the touch input by the input tool may be a user interface for receiving a signature input of the user.

The display unit may display a user interface for receiving the touch input by the body part of the user when it is determined that the hovering input is the input by the body part of the user.

The user interface for receiving the touch input by the body part of the user may be a user interface for receiving a password input of the user or a pattern input of the user.

The display unit may display a first user interface for unlocking the device, and the first user interface may be changed to a second user interface for unlocking the device, based on the determination result.

The first user interface may be determined according to whether a signature of the user is registered in the device.

According to one or more exemplary embodiments, a computer-readable recording medium storing a program for executing the method of one or more exemplary embodiments.

Mode for the Invention

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items.

It will be understood that when an element is referred to as being "on," "connected to" or "coupled to" another element, it may be directly on, electrically connected or coupled to the other element or intervening elements may be present. It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof.

FIG. 1 is a diagram of a device 1000 that selectively displays a user interface for unlocking the device 1000, according to an exemplary embodiment.

Referring to FIG. 1, when a disabled screen of the device 1000 is enabled, the device 1000 may selectively display user interfaces for unlocking the device 1000. As illustrated in FIG. 1B, the device 1000 may display a user interface (for example, a signature input window) for receiving a touch input by an input tool 20. Alternatively, as illustrated in FIG. 1C, the device 1000 may display a user interface (for example, a pattern input window) for receiving a touch input by a finger of a user. The input tool 20 may be attached to or detached from a groove provided in the device 1000. For example, the input tool 20 may include a stylus pen. However, the exemplary embodiment is not limited thereto.

In addition, the device 1000 may select or change the user interface to be displayed on a screen, based on a separation of the input tool 20 from the device 1000. In addition, the device 1000 may select or change the user interface to be displayed on a screen, based on a hovering input detected by the device 1000.

The device 1000 may include various devices to which the input tool 20 is attachable or detachable. For example, the device 1000 may be a smartphone, a smart TV, a mobile phone, a personal digital assistant (PDA), a laptop computer, a media player, a global positioning system (GPS) device, an e-book terminal, a digital broadcasting terminal, a navigation, a kiosk, an MP3 player, a digital camera, or other mobile or non-mobile computing devices, but is not limited thereto. In addition, the device 1000 may include various devices, such as an electronic bulletin board or a touch table, which are capable of receiving a touch input.

FIG. 2 is a flowchart of a method of selectively displaying a user interface for unlocking the device 100, based on a separation of an input tool, according to an exemplary embodiment.

In operation S200, the device 1000 may enable a disabled screen thereof. When the device 1000 is in a standby mode, the screen of the device 1000 may be disabled. When a button input by a user is received, the device 1000 may enable the disabled screen of the device 1000. For example, when a power button, a volume control button, or a home button of the device 1000 is pressed, the device 1000 may enable the disabled screen thereof. In addition, for example, when the input tool 20 is separated from the device 1000, the device 1000 may enable the disabled screen of the device 1000. In addition, for example, when the device 1000 receives a message, the device 1000 may enable the disabled screen of the device 1000. In addition, for example, when the device 1000 moves along a predetermined pattern, the device 1000 may detect the motion of the device 1000 by using a motion sensor provided within the device 1000 and enable the disabled screen of the device 1000.

In operation S210, the device 1000 may determine whether the input tool 20 is separated from the device 1000. The device 1000 may determine whether the input tool 20 is separated from the device 1000 by using a sensor provided within the device 1000. For example, the device 1000 may determine whether the input tool 20 is separated from the device 1000 by using a photo coupler provided in a main board of the device 1000. In addition, for example, the device 1000 may determine whether the input tool 20 is separated from the device 1000 by using a toggle switch provided in a portion where the input tool 20 is attached or detached within the device 1000.

In operation S220, the device 1000 may select one user interface among a plurality of user interfaces for unlocking the device 1000. The user interface for unlocking the device 1000 may be a user interface for guiding to a user a touch input for unlocking the device 1000. In addition, the user interface for unlocking the device 1000 may be divided into a user interface for receiving a touch input by the input tool 20 and a user interface for receiving a touch input by a body part of a user. The body part of the user may be, for example, a finger of the user.

In addition, for example, the user interface for receiving the touch input by the input tool 20 may be a user interface for receiving a signature input of a user. In addition, for example, the user interface for receiving the touch input by the body part of the user may include a user interface for receiving a pattern input of the user, a user interface for receiving a password input of the user, and a user interface for receiving a fingerprint input of the user. In addition, for example, the user interface for receiving the signature input of the user may include a description phrase for guiding the signature input of the user and a region for receiving the signature input of the user. In addition, for example, the user interface for receiving the pattern input of the user may include a description phrase for guiding the pattern input of the user and a plurality of points for receiving the pattern input of the user. In addition, for example, the user interface for receiving the password input of the user may include a description phrase for guiding the password input of the user and a keypad. In addition, for example, the user interface for receiving the fingerprint input of the user may include a text for guiding the fingerprint input of the user. However, the exemplary embodiment is not limited thereto. The user interface may be a user interface for receiving at least two selected from among the signature input of the user, the pattern input of the user, the password input of the user, and the fingerprint input of the user.

In addition, when it is determined that the input tool 20 is separated from the device 1000, the device 1000 may select a user interface for receiving the touch input by the input tool 20. For example, when it is determined that the input tool 20 is separated from the device 1000, the device 1000 may select a user interface for receiving the signature input of the user among a plurality of user interfaces.

In addition, when it is determined that the input tool 20 is not separated from the device 1000, the device 1000 may select a user interface for receiving the touch input by the body part of the user. For example, when it is determined that the input tool 20 is not separated from the device 1000, the device 1000 may select one user interface among the user interface for receiving the pattern input of the user, the user interface for receiving the button input of the user, and the user interface for receiving the fingerprint input of the user.

In operation S230, the device 1000 may display the selected user interface. The device 1000 may enable the disabled screen thereof and display the user interface selected in operation S220 on the screen of the device 1000. However, the exemplary embodiment is not limited thereto. The device 1000 may enable the disabled screen thereof, display a predetermined user interface or an image on the screen of the device 1000, and display the user interface selected in operation S220 on the screen of the device 1000.

In operation S240, the device 1000 may receive the touch input with respect to the displayed user interface. When the user interface for receiving the touch input by the input tool 20 is displayed on the screen of the device 1000, the device 1000 may receive the touch input by the input tool 20. In addition, when the user interface for receiving the touch input by the body part of the user is displayed on the screen of the device 1000, the device 1000 may receive the touch input by the body part of the user. In addition, the device 1000 may be unlocked based on the received touch input.

FIG. 3 is a flowchart of a method of selectively displaying a user interface for unlocking the device 100, based on a separation of an input tool, according to an exemplary embodiment.

In operation S300, the device 1000 may enable a disabled screen thereof. When the device 1000 is in a standby mode, the screen of the device 1000 may be disabled. When a button input by a user is received, the device 1000 may enable the disabled screen thereof. In addition, when the device 1000 moves along a predetermined pattern, the device 1000 may detect the motion of the device 1000 by using a motion sensor provided within the device 1000 and enable the disabled input tool 20.

In operation S305, the device 1000 may determine whether the input tool 20 is separated from the device 1000. The device 1000 may determine whether the input tool 20 is separated from the device 1000 by using an optical sensor or a toggle switch provided within the device 1000.

In operation S310, when it is determined in operation S305 that the input tool 20 is separated from the device 1000, the device 1000 may enable the sensor for detecting the touch input by the input tool 20. For example, the sensor for detecting a magnetic field generated by the input tool 20 may be positioned under the screen of the device 1000. In addition, when it is determined that the input tool 20 is separated from the device 1000, the device 1000 may enable the sensor for detecting the magnetic field generated by the input tool 20. However, the exemplary embodiment is not limited thereto. When the disabled screen of the device 1000 is enabled, the device 1000 may enable the sensor for detecting the touch input by the input tool 20, regardless of the separation of the input tool 20 from the device 1000.

In operation S315, the device 1000 may select the user interface for receiving the touch input by the input tool 20. For example, the device 1000 may select the user interface for receiving the signature input of the user.

In operation S320, the device 1000 may display the selected user interface. The device 1000 may display the user interface for receiving the touch input by the input tool 20 (for example, the user interface for receiving the signature input of the user) on the screen of the device 1000.

In operation S325, the device 1000 may receive the signature input of the user with respect to the selected user interface. The user may input the signature on the displayed user interface by using the input tool 20, and the device 1000 may receive the signature input of the user by using the sensor enabled in operation S310.

In operation S330, the device 1000 may be unlocked. The device 1000 may compare the received signature input with the signature stored in the device 1000. When it is determined that the received signature is matched with the stored signature, the device 1000 may be unlocked.

On the other hand, in operation S340, when it is determined in operation S305 that the input tool 20 is not separated from the device 1000, the device 1000 may enable the sensor for detecting the touch input by the body part of the user. For example, the screen of the device 1000 may be a touch screen, and the device may enable a touch sensor provided within the touch screen. In addition, the touch sensor may be implemented with a resistive touch sensor, a capacitive touch sensor, an infrared touch sensor, or an acoustic wave touch sensor. However, the exemplary embodiment is not limited thereto. When the disabled screen of the device 1000 is enabled, the device 1000 may enable the sensor for detecting the touch input by the body part of the user, regardless of the separation of the input tool 20 from the device 1000.

In operation S345, the device 1000 may select the user interface for receiving the touch input by the body part of the user. For example, the device 1000 may select one user interface among the user interface for receiving the pattern input of the user, the user interface for receiving the button input of the user, and the user interface for receiving the fingerprint input of the user.

In operation S350, the device 1000 may display the selected user interface. For example, the device 1000 may display one user interface among the user interface for receiving the pattern input of the user, the user interface for receiving the button input of the user, and the user interface for receiving the fingerprint input of the user.

In operation S355, the device 1000 may receive the password input or the pattern input with respect to the selected user interface. The user may draw the pattern or touch the password on the screen of the device 1000 with his or her finger, and the device 1000 may receive the input of the user by using the sensor enabled in operation S340. In addition, the device 1000 may recognize the fingerprint of the user.

In operation S330, the device 1000 may be unlocked. The device 1000 may compare the received pattern input with the pattern stored in the device 1000. When it is determined that the received pattern is matched with the stored pattern, the device 1000 may be unlocked. In addition, the device 1000 may compare the received password input with the password stored in the device 1000. When it is determined that the received password is matched with the stored password, the device 1000 may be unlocked. The device 1000 may compare the received fingerprint input with the fingerprint stored in the device 1000. When it is determined that the received fingerprint is matched with the stored fingerprint, the device 1000 may be unlocked.

FIG. 4 is a flowchart of a method of selectively displaying a user interface for unlocking a device 1000, based on a hovering input, according to an exemplary embodiment.

In operation S400, the device 1000 may enable a disabled screen thereof. When the device 1000 is in a standby mode, the screen of the device 1000 may be disabled. When a button input by a user is received, the device 1000 may enable the disabled screen thereof. In addition, when the device 1000 moves along a predetermined pattern, the device 1000 may detect the motion of the device 1000 by using a motion sensor provided within the device 1000 and enable the disabled input tool 20.

In operation S410, the device 1000 may receive a hovering input of the user. The user may approach the input tool 20 or his or her body part (for example, finger), without touching the screen of the device 1000, and the device 1000 may receive the hovering input of the user by detecting the input tool 20 or the body part approached to the screen of the device 1000.

In operation S420, the device 1000 may determine whether the hovering input of the user is an input by the input tool 20 or an input by the body part of the user.

The device 1000 may detect the hovering input by the input tool 20 by using a sensor for detecting a touch input by the input tool 20. The sensor for detecting the touch input by the input tool 20 may include a plurality of sensor coils, and the input tool 20 may include a coil and a capacitor. In addition, when a voltage is applied to the sensor coils of the sensor for detecting the touch input by the input tool 20, a magnetic field may be generated on the surface of the device 1000 and energy may be stored in a resonance circuit provided within the input tool 20. In addition, when the voltage application to the sensor coil is stopped, the magnetic field may be transferred from the input tool 20 to the sensor coil. Therefore, the device 1000 may detect the hovering input by the input tool 20. However, the exemplary embodiment is not limited thereto.

In addition, the device 1000 may detect the hovering input by the body part of the user by using a sensor for detecting a touch input by the body part of the user. The device 1000 may detect the hovering input by the body part of the user by using the touch sensor of the touch screen (for example, the capacitive touch sensor).

In addition, the device 1000 may determine whether the hovering input is an input by the input tool 20 or an input by the body part of the user, according to which sensor detects the hovering input.

In operation S430, the device 1000 may selectively display the user interface for unlocking the device 1000, based on the determination result in operation S420.

When it is determined that the hovering input is the input by the input tool 20, the device 1000 may display the user interface for receiving the touch input by the input tool 20 (for example, the user interface for receiving the signature input of the user) on the screen of the device 1000.

In addition, when it is determined that the hovering input is the input by the body part of the user, the device 1000 may display the user interface for receiving the touch input by the body part of the user (for example, at least one user interface among the user interface for receiving the pattern input of the user, the user interface for receiving the button input of the user, and the user interface for receiving the fingerprint input of the user).

In operation S440, the device 1000 may receive the touch input with respect to the displayed user interface. The device 1000 may receive the signature input of the user, the pattern input of the user, the password input of the user, or the fingerprint input of the user through the displayed user interface. In addition, the device 1000 may be unlocked based on the received input.

FIG. 5 is a detailed flowchart of the method of selectively displaying the user interface for unlocking the device 1000, based on the hovering input, according to an exemplary embodiment.

In operation S500, the device 1000 may enable the disabled screen thereof. In operation S505, the device 1000 may receive the hovering input of the user.

In addition, in operation S510, the device 1000 may determine whether the hovering input of the user is an input by the input tool 20 or an input by the body part of the user.

In operation S515, when it is determined in operation S510 that the hovering input of the user is the input by the input tool 20, the device 1000 may select the user interface for receiving the touch input by the input tool 20 (for example, the user interface for receiving the signature input of the user) and display the selected user interface on the screen of the device 1000.

In operation S520, the device 1000 may generate a virtual layer for receiving the touch input by the input tool 20. In addition, the device 1000 may display the virtual layer for receiving the touch input by the input tool 20 on the screen of the device 1000. In addition, the device 1000 may add the user interface selected in operation S315 to the virtual interface for receiving the touch input by the input tool 20.

In operation S525, the device 1000 may receive the signature input of the user with respect to the user interface displayed in operation S515. In addition, the device 1000 may receive the signature input of the user through the virtual layer generated in operation S520.

On the other hand, in operation S540, when it is determined in operation S510 that the hovering input of the user is the input by the body part of the user, the device 1000 may determine a size and a display position of the user interface for receiving the touch input by the body part of the user. The device 1000 may select the user interface, based on the position of the hovering input by the body part of the user, so that the user easily inputs the touch input for unlocking to the device 1000. In addition, the device 1000 may determine a size and a display position of the user interface, based on the position of the hovering input by the body part of the user, so that the user easily inputs the touch input for unlocking to the device 1000. For example, when the hovering input is detected in an upper portion of the screen of the device 1000, the device 1000 may display points for pattern input on the upper portion of the screen of the device 1000. In addition, for example, when the hovering input is detected in a right portion of the screen of the device 1000, the device 1000 may display a keypad for password input on the right portion of the screen of the device 1000. In addition, for example, when the hovering input is detected in a left portion of the screen of the device 1000, the device 1000 may display a guideline for fingerprint input on the left portion of the screen of the device 1000.

In operation S545, the device 1000 may display the user interface for receiving the touch input by the body part of the user on the screen of the device 1000. In operation S540, the device 1000 may display the user interface, based on the size and the position determined in operation S540.

In operation S550, the device 1000 may receive the password input or the pattern input with respect to the displayed user interface. The user may draw the pattern or touch the password on the screen of the device 1000 with his or her finger, and the device 1000 may receive the input of the user by using the sensor of the touch screen. In addition, the device 1000 may recognize the fingerprint of the user.

In operation S530, the device 1000 may be unlocked. The device 1000 may be unlocked based on the input received in operation S525 or S550.

FIG. 6 is a flowchart of a method of selectively displaying a user interface for unlocking a device 1000, based on a registration of a signature in the device 1000, according to an exemplary embodiment.

In operation S600, the device 1000 may enable a disabled screen thereof. When the device 1000 is in a standby mode, the screen of the device 1000 may be disabled. When a button input by a user is received, the device 1000 may enable the disabled screen of the device 1000. In addition, when the device 1000 moves along a predetermined pattern, the device 1000 may enable the disabled input tool 20.

In operation S610, the device 1000 may determine whether the signature of the user is registered in the device 1000.

In operation S620, when it is determined in operation S610 that the signature of the user is registered, the device 1000 may receive a hovering input. The user may approach the input tool 20 or his or her body part (for example, finger), without touching the screen of the device 1000, and the device 1000 may receive the hovering input of the user by detecting the input tool 20 or the body part approached to the screen of the device 1000.

In operation S630, the device 1000 may selectively display the user interface for unlocking the device 1000 according to whether the hovering input is the input by the input tool 20. When it is determined that the hovering input is the input by the input tool 20, the device 1000 may display the user interface for receiving the touch input by the input tool 20 (for example, the user interface for receiving the signature input of the user) on the screen of the device 1000. In addition, when it is determined that the hovering input is the input by the body part of the user, the device 1000 may display the user interface for receiving the touch input by the body part of the user (for example, at least one user interface among the user interface for receiving the pattern input of the user, the user interface for receiving the button input of the user, and the user interface for receiving the fingerprint input of the user).

In operation S640, when it is determined in operation S610 that the signature of the user is not registered, the device 1000 may display the user interface for receiving the touch input by the body part of the user. For example, the device 1000 may select at least one user interface among the user interface for receiving the pattern input of the user, the user interface for receiving the button input of the user, and the user interface for receiving the fingerprint input of the user.

FIG. 7 is a flowchart of a method of changing a user interface for unlocking a device 1000, based on a hovering input, according to an exemplary embodiment.

In operation S700, the device 1000 may enable the disabled screen of the device 1000. In operation S710, the device 1000 may display the user interface for unlocking the device 1000 on the screen of the device 1000. The user interface to be displayed may be previously set. The device 1000 may display either or both of the user interface for receiving the touch input by the input tool 20 and the user interface for receiving the touch input by the body part of the user. In a case where both of the user interface for receiving the touch input by the input tool 20 and the user interface for receiving the touch input by the body part of the user are displayed, the two user interfaces may be displayed in an overlapped manner. In addition, the transparency of the overlapped user interfaces may be adjusted. For example, the overlapped user interfaces may be translucently displayed.

In operation S720, the device 1000 may receive the hovering input of the user. In operation S730, the device 1000 may determine whether the hovering input of the user is an input by the input tool 20 or an input by the body part of the user.

In operation S740, the device 1000 may change the user interface displayed in operation S710, based on the determination result in operation S730. For example, when the user interface for receiving the touch input by the input tool 20 is displayed in operation S710 and it is determined in operation S730 that the hovering input is the input by the body part of the user, the device 1000 may change the displayed user interface to the user interface for receiving the touch input by the body part of the user. In addition, for example, when the user interface for receiving the touch input by the body part of the user is displayed in operation S710 and it is determined in operation S730 that the hovering input is the input by the input tool 20, the device 1000 may change the displayed user interface to the user interface for receiving the touch input by the input tool 20. In addition, for example, when both of the user interface for receiving the touch input by the input tool 20 and the user interface for receiving the touch input by the body part of the user are displayed in operation S710 and it is determined in operation S730 that the hovering input is the input by the body part of the user, the device 1000 may delete the user interface for receiving the touch input by the input tool 20. In addition, the device 1000 may opaquely display the user interface for receiving the touch input by the body part of the user.

FIG. 8 is a diagram illustrating a configuration of a device 1000 for determining whether an input tool 20 is separated from the device 1000, according to an exemplary embodiment.

As illustrated in FIG. 8A, the device 1000 may include a toggle switch provided in a main board 18 thereof. In addition, the toggle switch 30 may protrude within a range in which the input tool 20 is detached or attached. As the input tool 20 is detached from or attached to the device 1000, the toggle switch 30 may be pressed or released by the input tool 20. Therefore, the device 1000 may determine whether the input tool 20 is separated from the device 1000.

In addition, as illustrated in FIG. 8B, a photo coupler 40 may be provided at an end portion of the input tool 20 mounted on the device 1000. For example, the photo coupler 40 may be installed on the main board 18 in a surface mount device (SMD) type. In addition, by positioning the end portion of the input tool 20 mounted on the device 1000 between a light emitting portion 41 and a light receiving portion 42 of the photo coupler 40, the device 1000 may detect whether the light emitting portion 41 irradiates light on the light receiving portion 42. Therefore, the device 1000 may determine whether the input tool 20 is separated from the device 1000.

On the other hand, although not illustrated in FIG. 8, a hall sensor may be mounted on the main board 18 and a magnet may be installed at a predetermined position of the input tool 20. In addition, since a magnetic force of a magnet is detected by the hall sensor, the device 1000 may determine whether the input tool 20 is separated from the device 1000.

In addition, the method of determining whether the input tool 20 is separated from the device 1000 in the device 1000 is not limited to the method described with reference to FIG. 8, and the device 1000 may use various sensors to determine whether the input tool 20 is separated from the device 1000.

FIGS. 9A to 10D are diagrams of a device 1000 that selectively displays a user interface for unlocking a device 1000, based on attachment/detachment of an input tool 20, according to an exemplary embodiment.

Referring to FIG. 9A, when the input tool 20 is in a state of being separated from the device 1000, the disabled screen of the device 1000 may be enabled. In addition, referring to FIG. 9B, the device 1000 may determine that the input tool 20 has been separated from the device 1000. Accordingly, the device 1000 may display the user interface for receiving the signature input of the user on the enabled screen.

In addition, referring to FIG. 9C, the user may mount the input tool 20 within the device 1000. In addition, referring to FIG. 9D, the device 1000 may determine that the input tool 20 has not been separated from the device 1000. Accordingly, the device 1000 may change the displayed user interface to the user interface for receiving the pattern input of the user.

On the other hand, referring to FIG. 10A, when the input tool 20 is in a state of not being separated from the device 1000, the disabled screen of the device 1000 may be enabled. In addition, referring to FIG. 10B, the device 1000 may determine that the input tool 20 has not been separated from the device 1000. Accordingly, the device 1000 may display the user interface for receiving the pattern input of the user on the enabled screen.

In addition, referring to FIG. 10C, the user may separate the input tool 20 from the device 1000. In addition, referring to FIG. 10D, the device 1000 may determine that the input tool 20 has been separated from the device 1000. Accordingly, the device 1000 may change the displayed user interface to the user interface for receiving the signature input of the user.

FIGS. 11A to 12D are diagrams of a device 1000 that selectively displays a user interface for unlocking the device 1000, based on a hovering input, according to an exemplary embodiment.

Referring to FIG. 11A, when the input tool 20 is in a state of being separated from the device 1000, the disabled screen of the device 1000 may be enabled. In addition, referring to FIG. 11B, the device 1000 may display the preset user interface for receiving the pattern input of the user on the enabled screen.

In addition, referring to FIG. 11C, the user may approach the input tool 20 to the screen of the device 1000, and the device 1000 may receive a hovering input by the input tool 20. In addition, referring to FIG. 11D, the device 1000 may determine that the hovering input is an input by the input tool 20, and the device 1000 may change the displayed user interface to the user interface for receiving the signature input of the user.

On the other hand, referring to FIG. 12A, when the input tool 20 is in a state of being separated from the device 1000, the disabled screen of the device 1000 may be enabled. In addition, referring to FIG. 12B, the device 1000 may display the preset user interface for receiving the signature input of the user on the enabled screen.

In addition, referring to FIG. 12C, the user may approach his or her finger to the screen of the device 1000, and the device 1000 may receive a hovering input by the finger. In addition, referring to FIG. 12D, the device 1000 may determine that the hovering input is an input by the body part of the user, and the device 1000 may change the displayed user interface to the user interface for receiving the pattern input of the user.

FIGS. 13 and 14 are block diagrams of a device 1000 according to an exemplary embodiment.

As illustrated in FIG. 13, the device 1000 according to the exemplary embodiment may include a user input unit 1100, a display unit 1210, and a processor 1300. However, all illustrated elements are not essential elements. The device 1000 may be implemented with a larger number of elements than those illustrated in FIG. 13, or may be implemented with a smaller number of elements than those illustrated in FIG. 13.

For example, as illustrated in FIG. 14, the device 1000 according to the exemplary embodiment may further include an output unit 1200, a sensing unit 1400, a communication unit 1500, an audio/video (A/V) input unit 1600, and a memory 1700, in addition to the user input unit 1100, the display unit 1210, and the processor 1300.

Hereinafter, the elements of the device 1000 will be described in sequence.

The user input unit 1100 is a unit that allows the user to input data for controlling the device 1000. For example, the user input unit 1100 may include a key pad, a dome switch, a touch pad (a touch-type capacitive touch pad, a pressure-type resistive touch pad, an infrared beam sensing type touch pad, a surface acoustic wave type touch pad, an integral strain gauge type touch pad, a piezo effect type touch pad, or the like), a jog wheel, and a jog switch, but is not limited thereto.

The user input unit 1100 may receive the user input under the control of the processor 1300. For example, the user input unit 1100 may receive the user input for unlocking the device 1000.

The output unit 1200 outputs an audio signal, a video signal, or a vibration signal under the control of the processor 1300. The output unit 1200 may include a display unit 1210, an audio output unit 1220, and a vibration motor 1230.

The display unit 1210 displays information processed in the device 1000 under the control of the processor 1300. The display unit 1210 may display and change the user interface for unlocking the device 1000.

On the other hand, in a case where the display unit 1210 and a touch pad form a layered structure to constitute a touch screen, the display unit 1210 may also be used as an input unit as well as an output unit. The display unit 1210 may include at least one from among a liquid crystal display (LCD), a thin-film transistor-liquid crystal display (TFT-LCD), an organic light-emitting diode (OLED), a flexible display, a 3D display, and an electrophoretic display. According to implementations of the device 1000, the device 1000 may include two or more display units 1210. The two or more display units 1210 may be disposed to face each other by using a hinge.

The audio output unit 1220 outputs audio data that is received from the communication unit 1500 or is stored in the memory 1700. In addition, the audio output unit 1220 outputs an audio signal related to functions (for example, a call signal reception sound, a message reception sound, and a notification sound) performed by the device 1000. The audio output unit 1220 may include a speaker, a buzzer, or the like.

The vibration motor 1230 may output a vibration signal. For example, the vibration motor 1230 may output a vibration signal which corresponds to an output of audio data or video data (for example, a call signal reception sound, a message reception sound, or the like). In addition, the vibration motor 1230 may output a vibration signal when a touch is input to a touch screen.

The processor 1300 controls an overall operation of the device 1000. For example, the processor 1300 may control the user input unit 1100, the output unit 1200, the sensing unit 1400, the communication unit 1500, and the A/V input unit 1600 by executing a program stored in the memory 1700.

Specifically, the processor 1300 may enable a disabled screen of the device 1000. When the device 1000 is in a standby mode, the screen of the device 1000 may be disabled. When a button input by a user is received, the processor 1300 may enable the disabled screen of the device 1000.

In addition, the processor 1300 may determine whether the input tool 20 is separated from the device 1000. The processor 1300 may determine whether the input tool 20 is separated from the device 1000 by using a sensor provided within the device 1000. For example, the processor 1300 may determine whether the input tool 20 is separated from the device 1000 by using a photo coupler provided in a main board of the device 1000. In addition, for example, the processor 1300 may determine whether the input tool 20 is separated from the device 1000 by using a toggle switch provided in a portion where the input tool 20 is attached or detached within the device 1000.

In addition, when it is determined that the input tool 20 is separated from the device 1000, the processor 1300 may enable a sensor for detecting a touch input by the input tool 20. For example, the sensor for detecting a magnetic field generated by the input tool 20 may be positioned under the screen of the device 1000. In addition, when it is determined that the input tool 20 is separated from the device 1000, the processor 1300 may enable the sensor for detecting the magnetic field generated by the input tool 20.

On the other hand, when it is determined that the input tool 20 is not separated from the device 1000, the processor 1300 may enable a sensor for detecting a touch input by the body part of the user. For example, the screen of the device 1000 may be a touch screen, and the processor 1300 may enable a touch sensor provided within the touch screen. In addition, the touch sensor may be implemented with a resistive touch sensor, a capacitive touch sensor, an infrared touch sensor, or an acoustic wave touch sensor.

In operation, the processor 1300 may select one user interface among a plurality of user interfaces for unlocking the device 1000. The user interface for unlocking the device 1000 may be divided into a user interface for receiving the touch input by the input tool 20 and a user interface for receiving the touch input by the body part of the user. The body part of the user may be, for example, a finger of the user.

In addition, when it is determined that the input tool 20 is separated from the device 1000, the processor 1300 may select the user interface for receiving the touch input by the input tool 20. For example, when it is determined that the input tool 20 is separated from the device 1000, the processor 1300 may select a user interface for receiving the signature input of the user among a plurality of user interfaces.

In addition, when it is determined that the input tool 20 is not separated from the device 1000, the processor 1300 may select the user interface for receiving the touch input by the body part of the user. For example, when it is determined that the input tool 20 is not separated from the device 1000, the processor 1300 may select one user interface among the user interface for receiving the pattern input of the user, the user interface for receiving the button input of the user, and the user interface for receiving the fingerprint input of the user.

In addition, the processor 1300 may display the selected user interface by controlling the display unit 1210. The processor 1300 may enable the disabled screen of the device 1000 and display the selected user interface on the screen of the device 1000. However, the exemplary embodiment is not limited thereto. The processor 1300 may enable the disabled screen of the device 1000, display a predetermined user interface or an image on the screen of the device 1000, and display the selected user interface on the screen of the device 1000.

In addition, the processor 1300 may receive the touch input with respect to the displayed user interface by controlling the user input unit 1100. When the user interface for receiving the touch input by the input tool 20 is displayed on the screen of the device 1000, the processor 1300 may receive the touch input by the input tool 20. In addition, when the user interface for receiving the touch input by the body part of the user is displayed on the screen of the device 1000, the processor 1300 may receive the touch input by the body part of the user. In addition, the processor 1300 may unlock the device 1000, based on the received touch input.

On the other hand, the processor 1300 may receive a hovering input of the user by controlling the user input unit 1100. The user may approach the input tool 20 or his or her body part (for example, finger), without touching the screen of the device 1000, and the processor 1300 may receive the hovering input of the user by detecting the input tool 20 or the body part approached to the screen of the device 1000.

In addition, the processor 1300 may determine whether the hovering input of the user is an input by the input tool 20 or an input by the body part of the user.

The processor 1300 may detect the hovering input by the input tool 20 by using a sensor for detecting a touch input by the input tool 20. The sensor for detecting the touch input by the input tool 20 may include a plurality of sensor coils, and the input tool 20 may include a coil and a capacitor. In addition, when a voltage is applied to the sensor coils of the sensor for detecting the touch input by the input tool 20, a magnetic field may be generated on the surface of the device 1000 and energy may be stored in a resonance circuit provided within the input tool 20. In addition, when the voltage application to the sensor coil is stopped, the magnetic field may be transferred from the input tool 20 to the sensor coil. Therefore, the processor 1300 may detect the hovering input by the input tool 20. However, the exemplary embodiment is not limited thereto.

In addition, the processor 1300 may detect the hovering input by the body part of the user by using a sensor for detecting a touch input by the body part of the user. The processor 1300 may detect the hovering input by the body part of the user by using the touch sensor of the touch screen (for example, the capacitive touch sensor).

In addition, the processor 1300 may determine whether the hovering input is an input by the input tool 20 or an input by the body part of the user, according to which sensor detects the hovering input.

In addition, the processor 1300 may selectively display the user interface for unlocking the device 1000, according to whether the hovering input is the input by the input tool 20 or the input by the body part of the user.

When it is determined that the hovering input is the input by the input tool 20, the processor 1300 may control the display unit 1210 such that the user interface for receiving the touch input by the input tool 20 (for example, the user interface for receiving the signature input of the user) is displayed on the screen of the device 1000.

In addition, when it is determined that the hovering input is the input by the body part of the user, the processor 1300 may control the display unit 1210 such that the user interface for receiving the touch input by the body part of the user (for example, at least one user interface among the user interface for receiving the pattern input of the user, the user interface for receiving the button input of the user, and the user interface for receiving the fingerprint input of the user) is displayed on the screen of the device 1000.

On the other hand, the processor 1300 may determine whether the signature of the user is registered in the device 1000 and determine the user interface for unlocking the device 1000, based on the determination result. For example, when it is determined that the signature of the user is not registered in the device 1000, the processor 1300 may display the user interface for receiving the touch input by the body part of the user. In addition, for example, when it is determined that the signature of the user is registered in the device 1000, the processor 1300 may selectively display the user interface for receiving the touch input by the body part of the user and the user interface for receiving the touch input by the input tool 20.

On the other hand, the processor 1300 may enable the disabled screen of the device 1000 and display a preset first user interface on the screen of the device 1000. In addition, when the input tool 20 is detached or attached or the hovering input is received, the processor 1300 may change the displayed first user interface to a second user interface.

The sensing unit 1400 may detect a state of the device 1000 or a state around the device 1000 and transfer the detected information to the processor 1300. The sensing unit 1400 may include at least one selected from among a geomagnetic sensor 1410, an acceleration sensor 1420, a temperature/humidity sensor 1430, an infrared sensor 1440, a gyroscope sensor 1450, a position sensor (for example, GPS) 1460, a pressure sensor 1470, a proximity sensor 1480, and an RGB sensor (illuminance sensor) 149, but is not limited thereto. Since the functions of the respective sensors may be intuitively inferred from their names, a detailed description thereof will be omitted.

In addition, the sensing unit 1400 may include a sensor for detecting the touch input by the input tool and a sensor for detecting the touch input by the user. In this case, the sensor for detecting the touch input by the user may be included in the touch screen or the touch pad. In addition, the sensor for detecting the touch input by the input tool may be positioned under the touch screen or the touch pad or may be included in the touch screen or the touch pad.

The communication unit 1500 may include one or more elements for communication between the device 1000 and an external device (not illustrated) or communication between the device 1000 and a server (not illustrated). For example, the communication unit 1500 may include a short-range wireless communication unit 151, a mobile communication unit 152, and a broadcasting receiving unit 153.

The short-range wireless communication unit 1510 may include a Bluetooth communication unit, a Bluetooth low energy (BLE) communication unit, a near field communication (NFC) unit, a WLAN (WiFi) communication unit, a Zigbee communication unit, an infrared data association (IrDA) communication unit, a Wi-Fi direction (WFD) communication unit, an ultra wideband (UWB) communication unit, or an Ant+ communication unit, but is not limited thereto.

The mobile communication unit 1520 may transmit and receive a wireless signal with at least one selected from a base station, an external terminal, and a server on a mobile communication network. The wireless signal may include a voice call signal, a video call signal, or various types of data according to text/multimedia message transmission/reception.

The broadcasting receiving unit 1530 may receive broadcasting signals and/or broadcasting-related information from the outside via a broadcasting channel. The broadcasting channel may include a satellite channel and a terrestrial broadcast channel. According to various embodiments, the device 1000 may not include the broadcasting receiving unit 1530.

The A/V input unit 1600 functions to input audio or video signals and may include a camera 1610 and a microphone 1620. The camera 1610 may obtain an image frame, such as a still picture or a moving picture, through an image sensor in a video phone mode or a photographing mode. An image captured through the image sensor may be processed through the processor 1300 or a separate image processor (not illustrated).

The image frame processed in the camera 1610 may be stored in the memory 1700 or may be transmitted to the outside through the communication unit 1500. The A/V input unit 1600 may include two or more cameras according to the configuration type of the device 1000.

The microphone 1620 may receive external sound signals and process the external sound signals into electrical voice data. For example, the microphone 1620 may receive audio signals from an external device or a person who speaks. The microphone 1620 may use various noise removal algorithms for removing noise generated in the process of receiving external audio signals.

The memory 1700 may store a program for processing and control of the processor 1300 and may store input/output data.

The memory 1700 may include a storage medium selected from among a flash memory, a hard disk, a multimedia card micro type memory, a card type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. In addition, the device 1000 may operate a web storage or a cloud server that performs the storage function of the memory 1700 on the Internet.

The programs, stored in the memory 1700, may be classified into a plurality of modules according to functions. For example, the programs may be classified into a user interface (UI) module 1710, a touch screen module 1720, and a notification module 1730.

The UI module 1710 may provide a specialized UI or GUI that interworks with the device 1000 according to applications. The touch screen module 1720 may detect a touch gesture of a user on a touch screen and transmit information on the touch gesture to the processor 1300. According to an exemplary embodiment, the touch screen module 1720 may recognize and analyze touch codes. The touch screen module 1720 may be implemented with separate hardware including a controller.

Various types of sensors may be disposed inside or near the touch screen so as to detect a touch or a proximity touch on the touch screen. An example of a sensor for detecting a touch on the touch screen may be a tactile sensor. The tactile sensor is a sensor for detecting a contact of a specific object to such a degree that humans may feel the contact with the specific object or to a higher degree. The tactile sensor may detect various types of information such as information about a roughness of a contact surface, a hardness of a contact object, a temperature at a contact point, and the like.

In addition, an example of a sensor for detecting a touch on the touch screen is a proximity sensor. The proximity sensor is a sensor that detects the presence or absence of an object approaching a predetermined detection surface or an object existing near the sensor by using an electromagnetic force or infrared light, without mechanical contact. Examples of the proximity sensor includes a transmission-type photoelectric sensor, a direct reflection-type photoelectric sensor, a mirror reflection-type photoelectric sensor, a radio frequency oscillation-type proximity sensor, an electrostatic capacitance type proximity sensor, a magnetic-type proximity sensor, and an infrared proximity sensor. Touch gestures of a user may include a tap, a touch and hold, a double-tap, a drag, panning, a flick, a drag-and-drop, a swipe, and the like.

The notification module 1730 may output a signal for notifying an event occurrence of the device 1000. Examples of events occurring in the device 1000 include a call signal reception, a message reception, a key signal input, and a schedule notification. The notification module 1730 may output a notification signal in a form of a video signal via the display unit 1210 or in a form of an audio signal via the audio output unit 1220. The notification module 1730 may also output a notification signal in a form of a vibration signal via the vibration motor 1230.

Various embodiments of the present disclosure may be embodied as a recording medium, e.g., a program module to be executed in computers, which include computer-readable commands. The computer storage medium may include any usable medium that may be accessed by computers, volatile and non-volatile medium, and detachable and non-detachable medium. Also, the computer storage medium may include a computer storage medium and a communication medium. The computer storage medium includes all of volatile and non-volatile medium, and detachable and non-detachable medium which are designed to store information including computer readable commands, data structures, program modules or other data. The communication medium includes computer-readable commands, a data structure, a program module, and other transmission mechanisms, and includes other information transmission mediums.

It should be understood that the various embodiments described therein should be considered in a descriptive sense only and not for purposes of limitation. Descriptions of features or aspects within each embodiment should typically be considered as available for other similar features or aspects in other embodiments. For example, configuring elements that are singular forms may be executed in a distributed fashion, and also, configuring elements that are distributed may be combined and executed.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

The invention claimed is:

1. A method of unlocking a device, comprising:
   determining whether an input tool of the device is separated from the device, when a disabled screen of the device is enabled;
   selecting one user interface from among a plurality of user interfaces for unlocking the device, based on the determination result;
   displaying the selected user interface on a screen of the device; and
   receiving a touch input with respect to the displayed user interface,
   wherein the plurality of user interfaces include a user interface for receiving a touch input by the input tool and a user interface for receiving a touch input by a body part of a user.

2. The method of claim 1, further comprising, when it is determined that the input tool is separated from the device, enabling a sensor for detecting the touch input by the input tool,
   wherein the selecting of the user interface comprises selecting the user interface for receiving the touch input by the input tool, based on the determination that the input tool is separated from the device.

3. The method of claim 2, wherein the user interface for receiving the touch input by the input tool is a user interface for receiving a signature input of the user.

4. The method of claim 1, further comprising, when it is determined that the input tool is not separated from the device, enabling a sensor for detecting the touch input by the body part of the user,
   wherein the selecting of the user interface comprises selecting comprises selecting the user interface for receiving the touch input by the body part of the user, based on the determination that the input tool is not separated from the device.

5. The method of claim 4, wherein the user interface for receiving the touch input by the body part of the user is a user interface for receiving a password input of the user or a pattern input of the user.

6. The method of claim 1, further comprising selectively enabling a sensor for detecting the touch input by the input tool and a sensor for detecting the touch input by the body part of the user based on the determination result.

7. At least one non-transitory computer-readable recording medium for storing a computer program configured to be readable by at least one processor to instruct the at least one processor to execute a computer process for performing the method of claim 1.

8. A device comprising:
   a processor configured to determine whether an input tool of the device is separated from the device, when a disabled screen of the device is enabled, and select one user interface from among a plurality of user interfaces for unlocking the device, based on the determination result; and
   a display configured to display the selected user interface on a screen of the device,
   wherein the processor is further configured to unlock the device, based on a touch input with respect to the displayed user interface, and
   the plurality of user interfaces includes a user interface for receiving a touch input by the input tool and a user interface for receiving a touch input by a body part of a user.

9. The device of claim 8, wherein the processor is further configured to:
   enable a sensor for detecting the touch input by the input tool when it is determined that the input tool is separated from the device, and
   select a sensor for detecting the touch input by the input tool when it is determined that the input tool is separated from the device.

10. The device of claim 9, wherein the user interface for receiving the touch input by the input tool is a user interface for receiving a signature input of the user.

11. The device of claim 8, wherein the processor is further configured to:
    enable a sensor for detecting the touch input by the body part of the user when it is determined that the input tool is separated from the device, and
    select a user interface for detecting the touch input by the body part of the user when it is determined that the input tool is separated from the device.

12. The device of claim 11, wherein the user interface for receiving the touch input by the body part of the user is a user interface for receiving a password input of the user or a pattern input of the user.

13. The device of claim 8, wherein a sensor configured to detect the touch input by the input tool and a sensor configured to detect the touch input by the body part of the user are selectively enabled based on the determination result.

14. A device comprising:
    a user input unit interface configured to receive a hovering input of a user when a screen of the device is enabled;
    a processor configured to determine whether the hovering input is an input by an input tool or an input by a body part of the user; and
    a display configured to selectively display a first unlock screen user interface for unlocking the device in response to the processor determining the hovering input is the input by the input tool and a second unlock screen user interface for unlocking the device in response to the processor determining the hovering input is the body part of the user.

15. The device of claim 14, wherein the first unlock screen user interface is a user interface for receiving a touch input by the input tool.

16. The device of claim 15, wherein the first unlock screen user interface is a user interface for receiving a signature input of the user.

17. The device of claim 16, wherein the processor is further configured to unlock the device in response to the received signature input matching a stored signature.

18. The device of claim 14, wherein the second unlock screen user interface is a user interface for receiving a password input of the user or a pattern input of the user.

19. The device of claim 14, wherein the hovering input is contactless.

\* \* \* \* \*